United States Patent
Kettler et al.

(10) Patent No.: US 6,592,158 B2
(45) Date of Patent: Jul. 15, 2003

(54) METHOD OF MAKING A STEEL CROSSBEAM WHICH CROSSBEAM FORMS A COMPONENT OF A BUMPER FOR MOTOR VEHICLES, AND CROSSBEAM

(75) Inventors: Markus Kettler, Paderborn (DE); Udo Klasfauseweh, Gütersloh (DE); Peter Goer, Paderborn (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/812,724

(22) Filed: Mar. 20, 2001

(65) Prior Publication Data

US 2002/0140239 A1 Oct. 3, 2002

(30) Foreign Application Priority Data

Mar. 20, 2000 (DE) .......................................... 100 13 527

(51) Int. Cl.[7] .............................................. B60R 19/18
(52) U.S. Cl. ........................ 293/120; 188/371; 293/146
(58) Field of Search ................................. 293/102, 117, 293/120, 132, 133, 135, 142, 146; 188/371, 377; 343/711

(56) References Cited

U.S. PATENT DOCUMENTS

| | | | | |
|---|---|---|---|---|
| 3,721,433 A | * | 3/1973 | Sobel | 267/140 |
| 3,779,592 A | * | 12/1973 | Golze et al. | 293/120 |
| 3,983,962 A | * | 10/1976 | Torke | 188/377 |
| 4,160,562 A | * | 7/1979 | Crestetto | 293/120 |
| 4,266,818 A | * | 5/1981 | Hightower | 293/150 |
| 4,397,490 A | * | 8/1983 | Evans et al. | 293/120 |
| 4,533,166 A | * | 8/1985 | Stokes | 293/120 |
| 5,005,887 A | * | 4/1991 | Kelman | 293/120 |
| 5,290,079 A | * | 3/1994 | Syamal | 293/120 |
| 5,314,229 A | * | 5/1994 | Matuzawa et al. | 296/189 |
| 5,672,405 A | * | 9/1997 | Plank et al. | 428/133 |
| 6,168,226 B1 | * | 1/2001 | Wycech | 296/146.6 |
| 2002/0140239 A1 | * | 10/2002 | Kettler et al. | 293/102 |

FOREIGN PATENT DOCUMENTS

| | | | | |
|---|---|---|---|---|
| JP | 55-063030 | * | 5/1980 | 188/371 |
| JP | 58-063546 | * | 4/1983 | 293/102 |
| JP | 59-018047 | * | 1/1984 | 293/102 |
| JP | 04-257754 | * | 9/1992 | 293/120 |

* cited by examiner

*Primary Examiner*—D. Glenn Dayoan
*Assistant Examiner*—Paul Chenevert
(74) *Attorney, Agent, or Firm*—Henry M. Feiereisen

(57) ABSTRACT

In a method of making a steel crossbeam for use as component of a bumper for motor vehicles, a composite element is formed by attaching sheet metal strips in parallel disposition onto a broadside of a steel sheet strand across an entire length thereof, whereby the sheet metal strips have a width which is narrower than a width of the steel sheet strand. The composite element is then shaped through roll-forming in a direction transverse to the longitudinal extent of the composite element into a crossbeam.

1 Claim, 5 Drawing Sheets ethod of Making a Steel Crossbeam Which Crossbeam Forms a Component of a Bumper for Motor Vehicles, and Crossbeam

BACKGROUND OF THE INVENTION

Forward and rearward bumpers are provided for cars in the automotive industry, which bumpers are capable, particularly in the event of car collisions at low speed, to absorb impact energy, so as to minimize damage to the vehicles. A conventional embodiment of a bumper includes a crossbeam for attachment of two crash boxes by way of which the crossbeam is fixed to the longitudinal load-carrying beams of a motor vehicle, as well as a plastic cover which contributes to the determination of the drag coefficient ($c_w$ value) and allows a visually appealing appearance.

Crossbeams of the type involved here are hitherto manufactured either from pressed pieces, from tubular members, or from steel sheet strands shaped through roll-forming. Among these manufacturing methods, roll-forming is the economically most attractive option due to the high shaping velocity and a low number of processing steps.

One problem associated with the roll-forming process resides in the fact that the crossbeams are made of steel sheet or steel sheet strands with uniform thickness and quality throughout. While for a crossbeam not all portions need to show, as a matter of demands made and type, the same thickness, it is, however, always necessary to utilize the steel sheets of a thickness which corresponds to the demands which are maximally made of a crossbeam. There exist, however, regions which do not require such a thickness. As a consequence, the material consumption for the crossbeams is unnecessarily large.

SUMMARY OF THE INVENTION

Based on this prior art, it is an object of the invention to provide, using the roll-forming process, on the one hand, a method for the manufacture of crossbeams as components of bumpers, which crossbeams are optimized as to weight, and, on the other hand, crossbeams which are optimized as to weight.

In the first solution variant, a steel sheet strand having throughout same thickness, width, and quality is provided on one of its broad sides over the entire length with sheet metal strips which extend in longitudinal direction in parallel relationship, and which with respect to the width of the steel sheet strand are, however, narrower. These sheet metal strips are secured on the steel sheet strand, whereby all known joining operations may be used, such as, for example, laser welding or continuous roller welding, gluing, punch riveting, and so forth.

The narrow sheet metal strips are secured on the steel sheet strands at those locations where the finished crossbeam should be configured to match the function as predetermined by the respective strength-crash-behavior with respect to the demands made of the crossbeam and with respect to type. Hereby, the particular advantage is realized that in accordance with the various functions, the sheet metal strips can be best suited as far as their thickness, and/or their width, and/or their quality are concerned. The steel sheet strand as the base element ensures hereby that the desired minimum functions are met with respect to stress. This means, it has the minimum thickness and minimum quality.

Such a composite element, also referred to as "patchwork blank", is subsequently shaped into the crossbeam through a roll-forming process in a direction transversely to its longitudinal extension. The sheet metal strips are then precisely positioned at those locations where the crossbeam is to be stiffened. This stiffening can, accordingly, be functionally met either by a corresponding thickness, and/or width, and/or quality of the sheet metal strips.

Within the scope of the second solution variant, initially steel metal strips of same or differing width, and/or thickness, and/or quality are joined along their parallel longitudinal sides to a strand-shaped composite element ("tailored blank") with a planar broadside. As a consequence, a profile is realized on the other broadside of the composite element, as explained above with reference to the second solution variant.

When this composite element is subsequently shaped into the crossbeam by a roll-forming process in a direction transversely to its longitudinal extent, the areas, which protrude with respect to the thinnest steel sheet strips, are positioned precisely in those cross-sectional portions which should be reinforced at the crossbeam.

In the third solution variant, the steel sheet strand with same thickness, width, and quality throughout is exclusively shaped by roll-forming, on the one hand to the desired cross-section of the crossbeam and, on the other hand, is provided with reinforcing folds in predetermined cross-sectional portions. These reinforcing folds can be of double-layer or multi-layer configuration. They are always positioned in the cross-sectional profile of the respective crossbeam. They may extend parallel to its web or its legs or extend perpendicular with respect thereto.

Regardless as to which solution variant is chosen, the particular advantage of the invention resides in the considerable savings in weight, as compared to crossbeams produced conventionally by roll-forming, while yet always realizing uniform wall thickness and identical quality. As a result of the method according to the invention, a targeted arrangement of different thicknesses, widths, and materials implements a specific crash behavior which can be best suited. This method, furthermore, has the advantage that additional manufacturing steps which follow the shaping, such as, for example, incorporating reinforcements by welding, can be eliminated, since the reinforcements are already incorporated during the manufacture of the composite elements. This provides for substantial savings in tool costs and manufacturing costs.

BRIEF DESCRIPTION OF THE DRAWING

Exemplified embodiments of the invention will now be explained in more detail with reference to the drawings, in which.

DETAILED DESCRIPTION OF PREFERRED EMBODIMENTS

Figure 1:
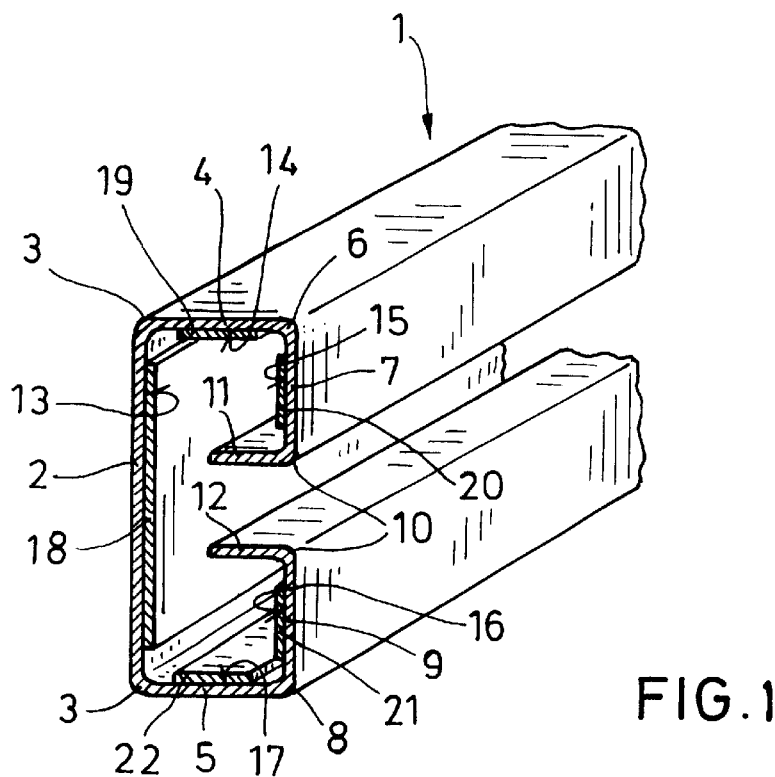
FIG. 1 is a perspective view of a longitudinal portion of a crossbeam for a motor vehicle.

A steel crossbeam, which is part of a bumper, not shown in more detail, for a motor vehicle is designated with 1 in FIG. 1. The crossbeam 1, illustrated only by way of a short portion thereof, has a C-shaped cross-section which is comprised of: a base web 2; two upper and lower legs 4, 5, formed in one piece via curved transitions 3 to the top and bottom of the base web 2 at an angle of 90°; an upper flange 7 which is formed in one piece via a curved transition 6 to the upper leg 5 in parallel relationship to the base web 2; a lower flange 9 which is formed in one piece via a curved transition 8 to the lower leg 4 in parallel relationship to the base web 2; and two upper and lower land areas 11, 12, formed respectively in one piece via curved transitions 10 to the upper flange 7 and the lower flange 9 at an angle of 90° and pointing towards the base web 2.

On the inner surfaces 13–17 of the base web 2, the upper leg 4, the upper flange 7, the lower flange 9, and of the lower leg 5, there are disposed, for the purpose of stiffening, sheet metal strips 18–22 of a width, which is narrower than a width of the inner surfaces 13–17, and a thickness, which is of smaller dimension than the thickness of the base web 2, upper leg 4, lower leg 5, upper flange 7, upper land area 11, lower land area 12, and lower flange 9. The sheet metal strips 18–22 extend over the full length of the crossbeam 1.

Figure 2:
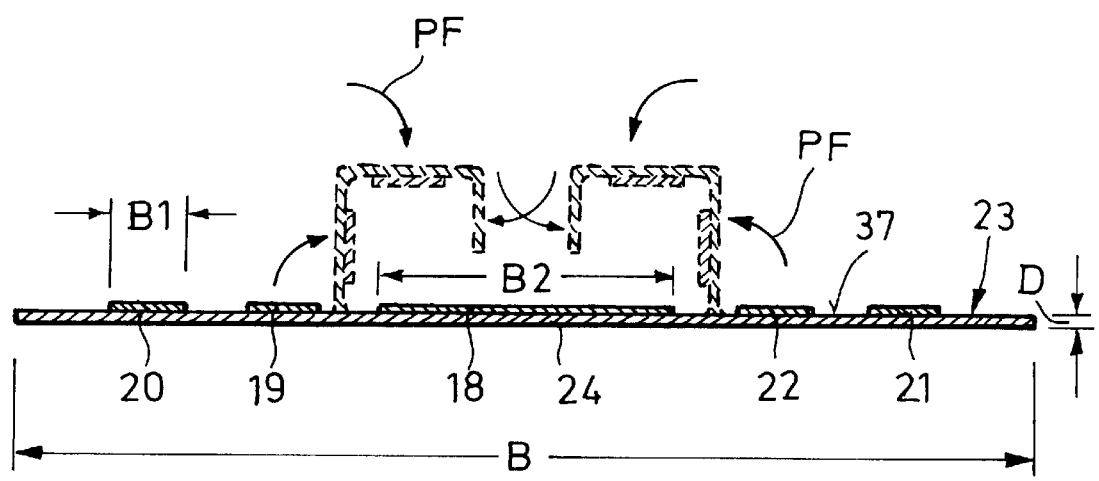
FIG. 2 shows a composite element for the manufacture of the crossbeam according to FIG. 1 during a shaping process.

The crossbeam 1 of FIG. 1 is manufactured from a composite element 23 in accordance with FIG. 2 by way of a roll-forming process.

Initially, the sheet metal strips 18–22 of differing widths, B1, B2 are secured, for example, by laser welding onto a broadside 37 of a steel sheet strand 24, having a constant thickness D, width B, and quality throughout. Subsequently, the composite element 23 in accordance with FIG. 2 is shaped by means of the roll-forming process in successive steps in accordance with the arrows PF into the crossbeam 1 according to FIG. 1.

Figure 3:
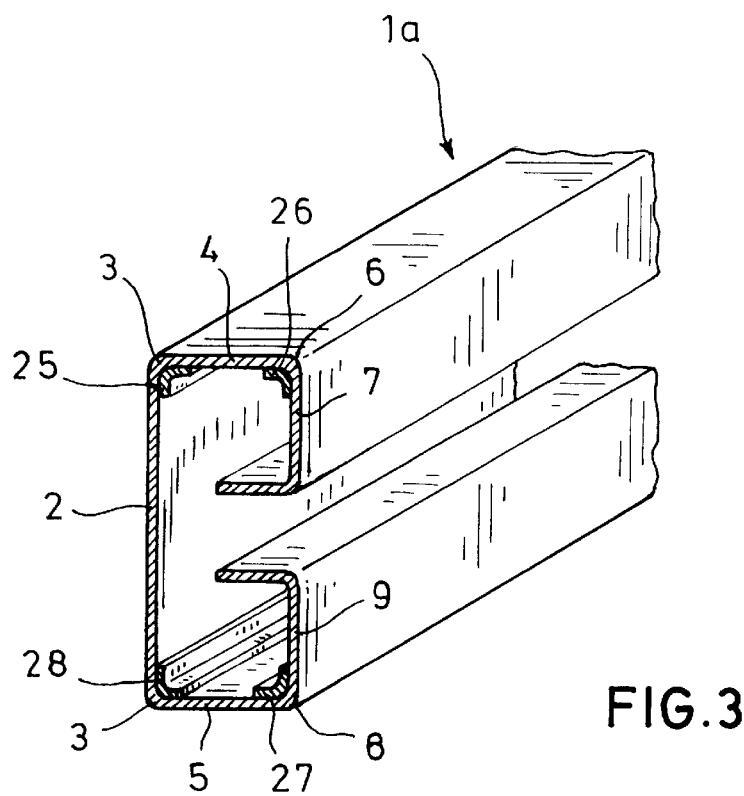
FIG. 3 is a perspective view of a longitudinal portion of a crossbeam for a motor vehicle in accordance with a further embodiment.
Figure 4:
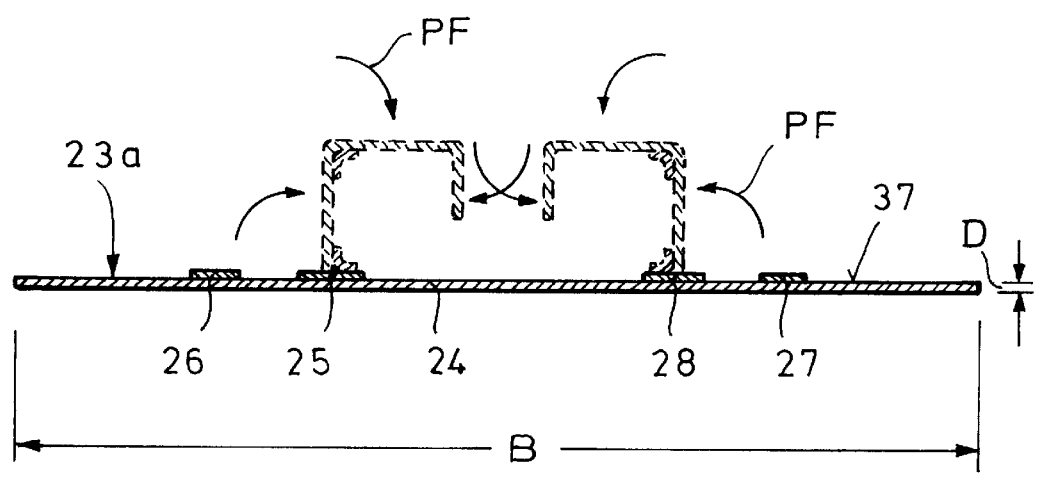
FIG. 4 is a vertical cross-section of a composite element for the manufacture of a crossbeam according to FIG. 3.

When a C-shaped crossbeam 1a embodiment in accordance with FIG. 3 is involved, which is shaped, by way of a roll-forming process, from a composite element 23a in accordance with FIG. 4, sheet metal strips 25–28 are disposed on the inner sides of the transitions 3, 6, and 8, between the base web 2 and the upper leg 4 and the lower leg 5, respectively, as well as between the upper leg 4 and the upper flange 7, on the one hand, and the lower leg 5 and the lower flange 9, on the other hand.

Shaping of the composite element 23a in accordance with FIG. 4 from a steel sheet strand 24 and of the sheet metal strips 25–28 secured on a broadside 37, for example, by laser welding, is carried out by way of the roll-forming process basically in a same manner as described in connection with crossbeam 1 of FIGS. 1 and 2 according to the arrows PF.

Figure 5:
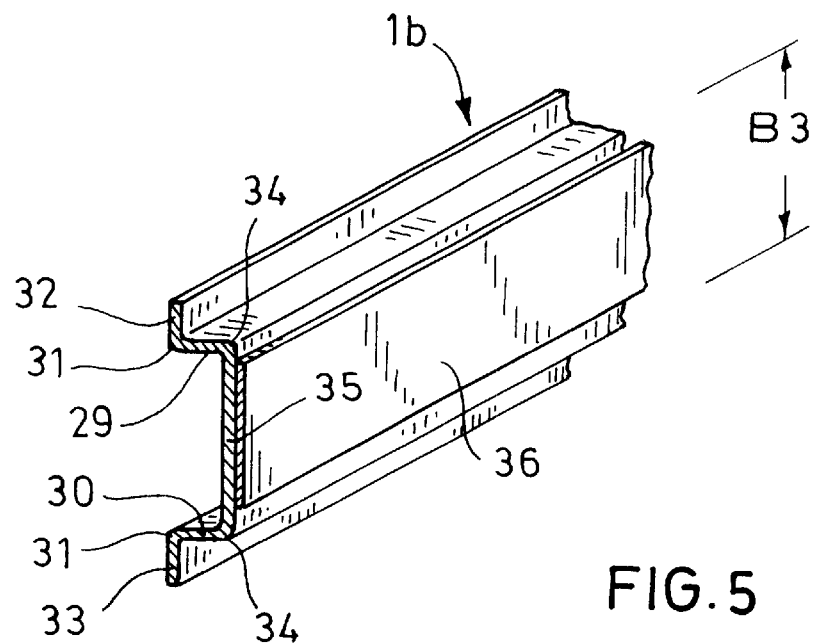
FIG. 5 is a perspective view of a longitudinal portion of a crossbeam for a motor vehicle in accordance with a third embodiment.

The crossbeam 1b illustrated in FIG. 5 has a U-shaped cross-section, with an upper flange 32 and a lower flange 33 formed via curved transitions 31 to an upper leg 29 and a lower leg 30, respectively. The upper flange 32 and the lower flange 33 extend in the same plane and parallel to a base web 35 which connects the legs 29, 30 by way of curved transitions 34.

Secured, for example, by laser welding, to the outer side of the base web 35 is a sheet metal strip 36 which, in comparison with the width B3 of the base web 35, has a narrower width.

Figure 6:
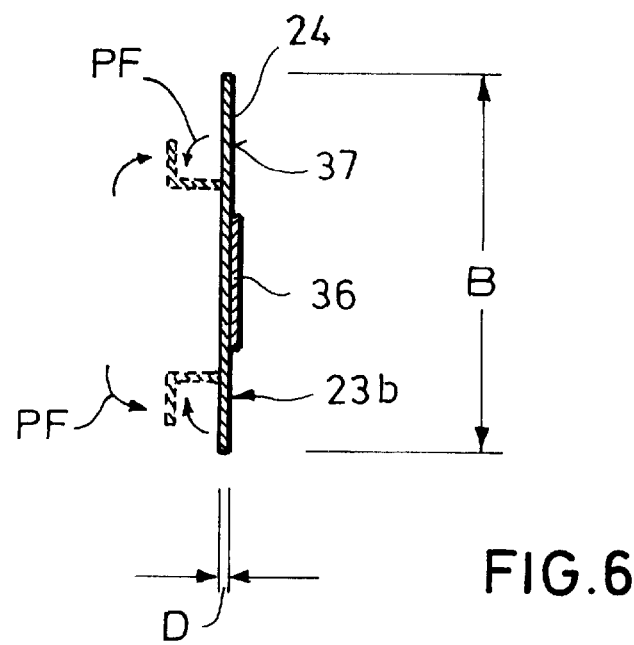
FIG. 6 is a vertical cross-section of a composite element for the manufacture of the crossbeam of FIG. 5 during a shaping process.

As shown in FIG. 6, the manufacture of the crossbeam 1b according to FIG. 5 is realized by initially attaching the sheet metal strip 36 on a broadside 37 of a steel sheet strand 24 with constant thickness D and width B throughout. Subsequently, the composite element 23b produced hereby by way of a roll-forming process is shaped in accordance with the arrows PF into the cross-section of the crossbeam 1b in accordance with FIG. 5.

Figure 7:
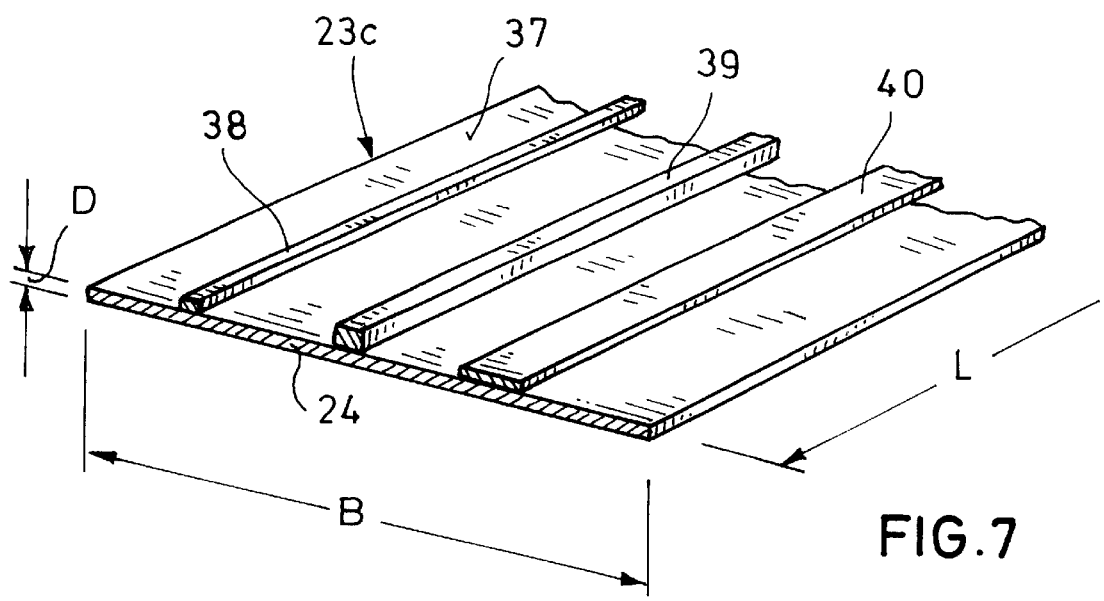
FIG. 7 is a perspective view of a longitudinal portion of a composite element for the manufacture of a crossbeam in accordance with a fourth embodiment.

FIG. 7 shows a schematic perspective view of a composite element 23c which can be shaped by way of a roll-forming process into a crossbeam according, for example, to FIG. 1 or FIG. 2. It is shown that such a composite element 23c is formed from a steel sheet strand 24 having a constant thickness D, width B, and quality throughout and from sheet metal strips 38, 39, 40 of same or differing thickness, and/or width, and/or quality (patchwork blank), which extend across the entire length L in parallel relationship and have a smaller width than the width B of the steel sheet strand 24. The sheet metal strips 38–40 are secured, for example, by laser welding, on a broadside 37 of the steel sheet strand 24.

Figure 8:
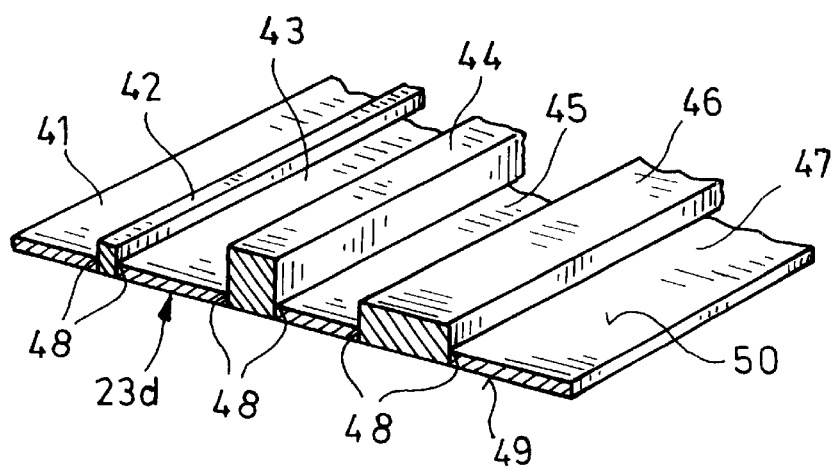
FIG. 8 is a perspective view of a longitudinal portion of a composite element for the manufacture of a crossbeam in accordance with a fifth embodiment.

The composite element 23d (tailored blank) according to FIG. 8 may also be shaped into crossbeams for motor vehicles according to FIG. 1 or 3 by way of the roll-forming process, and is realized in a strand-like configuration with a planar broadside 49 by initially joining steel sheet metal strips 41–47 of same or differing width, and/or thickness, and/or quality, along their parallel longitudinal sides 48. On the other broadside 50 of the sheet metal strips 41, 43, 45, and 47 having uniform thickness, the composite element 23d is then profiled by the sheet metal strips 42, 44, and 46. The composite element 23d is subsequently shaped to the desired crossbeam by way of a roll-forming process in a manner transverse to its longitudinal extent.

Figure 11:
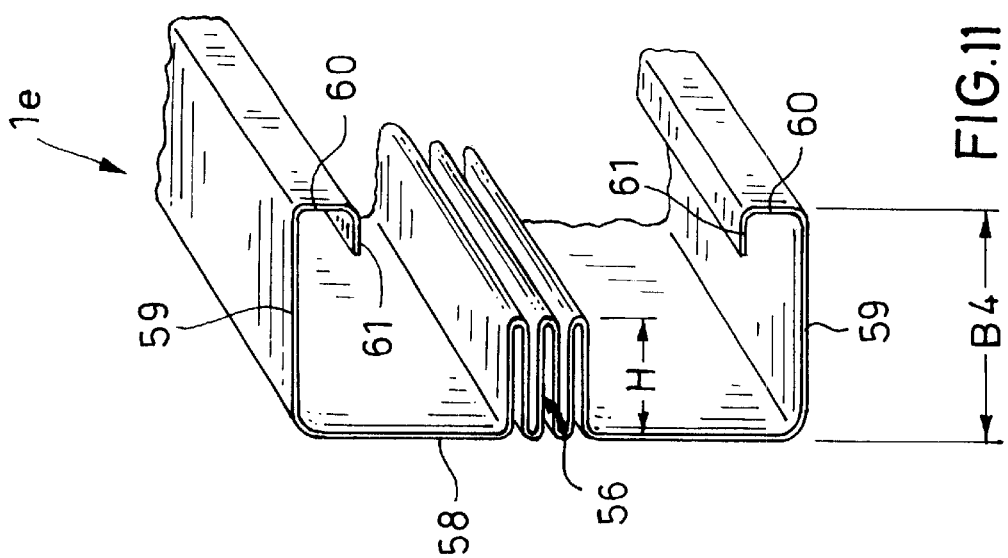
FIG. 11 is a perspective view of a longitudinal portion of a crossbeam for a motor vehicle in accordance with an eighth embodiment.
Figure 10:
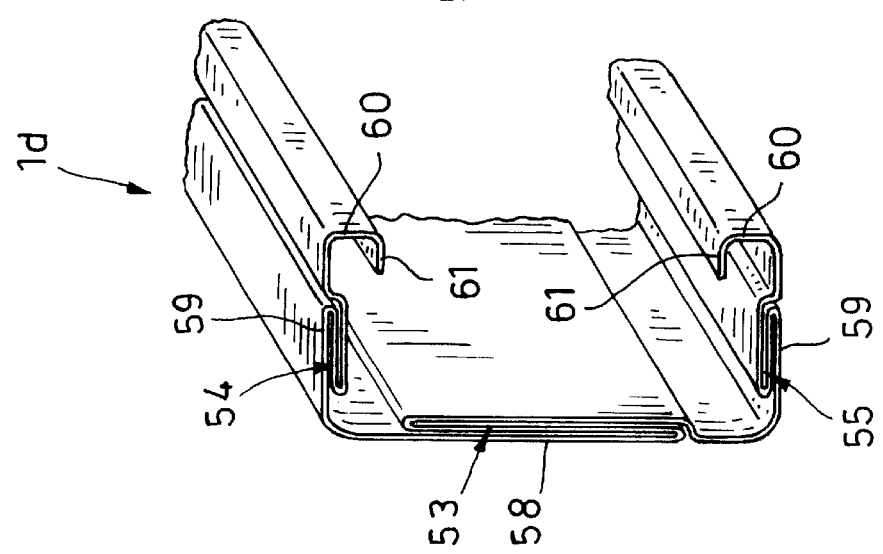
FIG. 10 is a perspective view of a longitudinal portion of a crossbeam for a motor vehicle in accordance with a seventh embodiment.
Figure 9:
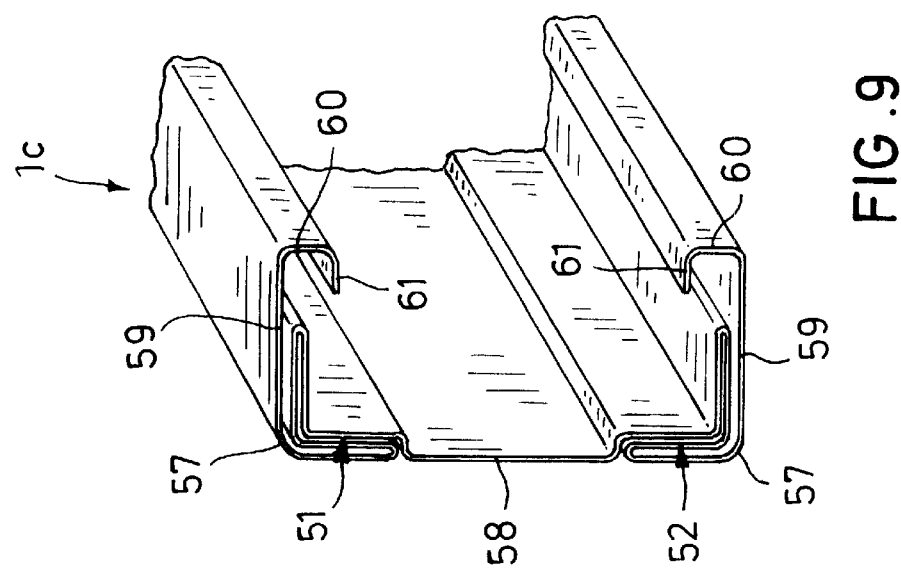
FIG. 9 is a perspective view of a longitudinal portion of a crossbeam for a motor vehicle in accordance with a sixth embodiment.

FIGS. 9 to 11 show schematically crossbeams 1c–e as components of bumpers, not shown in more detail, which are produced, at predetermined cross-sectional portions, with reinforcements formed by folds 51–56 of the starting material, for example, a steel sheet strand 24 according to FIG. 2, during roll forming of the crossbeams 1c–e.

Thus, the roll-forming process of a steel sheet strand 24 of uniform thickness D, width B, and quality throughout, realizes, on the one hand, that the cross section of the crossbeams 1c–e becomes not only a C-shaped cross-section in the embodiments according to FIGS. 9 to 11, but at the same time the reinforcing folds 51–56 in the predetermined cross-sectional portions are created.

All reinforcing folds 51–56 are thereby positioned within the cross-sectional profile of the crossbeams 1c–e.

In the embodiment of FIG. 9, the reinforcing folds 51, 52 are located in the corner regions 57 of the crossbeam 1c and, more particularly, between a web 58 and legs 59. The reinforcing folds 51, 52 extend parallel to the web 58 and, also, parallel to the legs 59.

Provided at the end of the legs 59 are flanges 60 which confront one another and extend parallel with respect to the web 58. Attached to the flanges 60 are land areas 61 which extend parallel to the legs 59 and point in the direction of the web 58.

In the embodiment of a crossbeam 1*d* according to FIG. 10, the reinforcing folds 53 are made in parallel relationship to the web 58, and the reinforcing folds 54, 55 are made in parallel relationship to the legs 59, that is in the central regions.

Otherwise, the crossbeam 1*d* corresponds to the one shown in FIG. 9 so that a repetition of the description is omitted.

The embodiment of a crossbeam 1*e* in accordance with FIG. 11 shows reinforcing folds 56 in the central region of the web 58, whereby these reinforcing folds 56 extend vertically to the web 58. The height H of the reinforcing folds 56 is approximately half the width B4 of the legs 59.

The remaining configuration of the crossbeam 1*e* corresponds to the one illustrated in FIG. 9. A further description is therefore omitted.

What is claimed is:

1. A method of making a steel crossbeam for use as component of a bumper for motor vehicles, comprising the steps of:

joining a plurality of steel sheet metal strips along their parallel longitudinal sides to form a strand-shaped composite element with a planar broadside and a profiled broadside; and roll-forming the composite element in a direction transverse to its longitudinal extent into a crossbeam.

* * * * *